US009694282B2

(12) United States Patent
Cullen et al.

(10) Patent No.: US 9,694,282 B2
(45) Date of Patent: Jul. 4, 2017

(54) IMPORTING AUDIO TO AFFECT GAMEPLAY EXPERIENCE

(75) Inventors: Geoff Cullen, Hove (GB); Serkan Hassan, Hove (GB); Steve Rockett, Lewes (GB); Ciaran Rooney, Brighton (GB); Erasmus Talbot, Brighton (GB)

(73) Assignee: Disney Enterprises, Inc., Burbank, CA (US)

(*) Notice: Subject to any disclaimer, the term of this patent is extended or adjusted under 35 U.S.C. 154(b) by 207 days.

(21) Appl. No.: 13/083,082

(22) Filed: Apr. 8, 2011

(65) Prior Publication Data
US 2012/0258798 A1    Oct. 11, 2012

(51) Int. Cl.
A63F 13/424    (2014.01)
A63F 13/63    (2014.01)
A63F 13/54    (2014.01)

(52) U.S. Cl.
CPC ............ *A63F 13/424* (2014.09); *A63F 13/63* (2014.09); *A63F 13/54* (2014.09); *A63F 2300/1081* (2013.01); *A63F 2300/6018* (2013.01); *A63F 2300/6063* (2013.01); *A63F 2300/6072* (2013.01); *A63F 2300/6081* (2013.01); *A63F 2300/8047* (2013.01); *A63F 2300/8076* (2013.01)

(58) Field of Classification Search
CPC ...... A63F 2300/6018; A63F 2300/6063; A63F 2300/6072; A63F 2300/6081; A63F 2300/8047; A63F 13/424
USPC .......................................................... 463/35
See application file for complete search history.

(56) References Cited

U.S. PATENT DOCUMENTS

| 5,845,241 | A  | * | 12/1998 | Owechko ..................... 704/203 |
| 6,319,130 | B1 | * | 11/2001 | Ooseki ................... G06T 15/00 434/307 A |
| 6,699,123 | B2 |   | 3/2004  | Matsuura et al. |
| 7,096,079 | B2 |   | 8/2006  | Matsuura et al. |
| 2001/0037181 | A1 |   | 11/2001 | Matsuura et al. |
| 2001/0048762 | A1 |   | 12/2001 | Matsuura et al. |
| 2001/0051541 | A1 |   | 12/2001 | Matsuura et al. |
| 2002/0072411 | A1 |   | 6/2002  | Matsuura et al. |
| 2002/0101423 | A1 |   | 8/2002  | Matsuura et al. |

(Continued)

FOREIGN PATENT DOCUMENTS

| EP | 1095678 A2 | 5/2001 |
| EP | 1095681 A2 | 5/2001 |

(Continued)

OTHER PUBLICATIONS

Tom Clancy's H-A-W-X, 2009, Ubisoft.*

(Continued)

*Primary Examiner* — Werner Garner
(74) *Attorney, Agent, or Firm* — Patterson + Sheridan, LLP (57) ABSTRACT

Techniques are described for altering the gameplay of a computer game based on imported audio content. Embodiments of the invention receive a selection of external audio content to import into a computer game. Embodiments import the selected audio content into the computer game. One or more acoustic characteristics of the imported audio content are then determined by analyzing the imported audio content. Embodiments of the invention then affect one or more graphical elements of the computer game, based on the determined one or more acoustic characteristics of the audio content.

26 Claims, 6 Drawing Sheets

(56) References Cited

U.S. PATENT DOCUMENTS

| | | | |
|---|---|---|---|
| 2002/0103023 | A1 | 8/2002 | Matsuura et al. |
| 2002/0161462 | A1 | 10/2002 | Fay et al. |
| 2006/0122840 | A1* | 6/2006 | Anderson et al. ............ 704/275 |
| 2007/0155494 | A1 | 7/2007 | Wells et al. |
| 2009/0275409 | A1* | 11/2009 | Itami et al. .................... 463/35 |
| 2010/0144439 | A1* | 6/2010 | Watanabe et al. ............ 463/40 |
| 2010/0304810 | A1 | 12/2010 | Stoddard |
| 2011/0003638 | A1* | 1/2011 | Lee et al. ....................... 463/35 |

FOREIGN PATENT DOCUMENTS

| | | | |
|---|---|---|---|
| JP | 11219443 | A2 | 8/1999 |
| JP | 2001184516 | A | 7/2001 |
| JP | 2001184517 | A | 7/2001 |
| JP | 2002284261 | A | 10/2002 |
| JP | 2002320772 | A | 11/2002 |
| JP | 2003169962 | A | 6/2003 |
| JP | 2003181136 | A | 7/2003 |
| JP | 2005034318 | A | 2/2005 |
| JP | 2006102270 | A | 4/2006 |
| JP | 2006326021 | A | 12/2006 |
| JP | 2007325847 | A | 12/2007 |
| JP | 2008167834 | A | 7/2008 |
| JP | 2009-237345 | A | 10/2009 |
| JP | 2009233208 | A | 10/2009 |
| WO | 2005031627 | A1 | 4/2005 |

OTHER PUBLICATIONS

"[Macro] Warrior shield swap (fury and arms)", Aug. 11, 2009, Ownedcore, available at <www.ownedcore.com/forums/world-of-warcraft/world-of-warcraft-general/wow-ui-macros-talent-specs/253434-macro-warrior-shield-swap-fury-arms.html>.*
"Asteroids—Atari Game Program Instructions", 1979, Atari, Inc.*
Anonymous, "Audiosurf: About the Game", 2008, Valve Corporation, <http://web.archive.org/web/20080913014557/http://store.steampowered.com/app/12900>.
Wroten, Alexander, "Developing Musical Video Games Through Principles of Player-Music Interaction", Jun. 2011, Dartmouth College, <http://www.alexwroten.com/downloads/AlexWroten-MastersThesis.pdf>.
Martin, Joe, "Audiosurr", bitGamer, Feb. 26, 2008, Dennis Publishing Limited, <http://www.bit-tech.net/gaming/pc/2008102/26/audiosurf/1>.
Fahey, Mike, "Beat Hazard: One Man's Quest to Make Your Music Hurt You", Kotaku—The Gamer's Guide, Apr. 19, 2010, Gawker Media, <http://kotaku.com/5520256/beat-hazard-ones-mans-quest-to-make-your-music-hurt-you>.
Cathie, Andrew, "Beat Hazard Review", PALGN, May 29, 2010, PAL Gaming Network, <http://palgn.com.au/pcgaming/16492/beat-hazard-review>.
Anonymous, "Beat Hazard—About the Game", 2013, Valve Corporation, <http://store.steampowered.com/app/49600>.
Wilburn, Thomas, "The AudioFile, Part One: Basics of Uncompressed Digital Audio (PCM)", Sep. 18, 2007, Thomas Wilburn (.net), <http://thomaswilburn.net/blosxom.php/writing>.
Sharkey, Scott, "Audiosurf (PC): The best possible excuse to rediscover your CD/MP3 collection", 1up.com, Feb. 26, 2008, 1up Games, <http://www.1up.com/reviews/audiosurf>.
Buckland, Jeff, "Beat Hazard Review", AtomicGamer, Apr. 23, 2010, TeleFragged LLC, <http://www.atomicgamer.com/articles/1033/beat-hazard-review>.
Buckland, Jeff, "Audiosurf Review", AtomicGamer, Feb. 22, 2008, TeleFragged LLC, <http://www.atomicgamer.com/articles/531/audiosurf-review>.
Smith, Graham, "Audiosurf creator speaks: Meet the man behind the funky loops", CVG: ComputerAndVideoGames.com, Feb. 11, 2008, Future Publishing Limited, <http://www.computerandvideogames.com/181999/interviews/audiosurf-creator-speaks/>.
Edwards, Tim, "Audiosurf rides Steam", ComputerAndVideoGames.com, Feb. 11, 2008, Future Publishing Limited, <http://www.computerandvideogames.com/181997/blog/audiosurf-rides-steam/>.
Elrod, Corvus, "Review: Audiosurr", The Escapist, Feb. 15, 2008, Alloy Digital, LLC, <http://www.escapistmagazine.com/articles/view/editorials/reviews/2936-Review-Audiosurf>.
Vanord, Kevin, "Beat Hazard Review", GameSpot, Apr. 22, 2010, CBS Interactive Inc., <http://www.gamespot.com/beat-hazard/reviews/beat-hazard-review-6259809/>.
Alec Meer, "AudioSurf: A near-religious musical gaming experience", GamesRadar, Feb. 28, 2008 Future US, Inc., <Tittp://www.gamesradar.com/audiosurf-review/>.
Ahearn, Nate, "Beat Hazard Review", IGN, Jul. 15, 2010, IGN.com, <http://www.ign.com/articles/2010/07/16/beat-hazard-review>.
Onyett, Charles, "Audiosurf Review", IGN, Feb. 27, 2008, IGN.com, <http://www.ign.com/articles/2008/02/28/audiosurf-review>.
Henderson, Tim, "Audiosurf AU Review", IGN, Feb. 25, 2008, IGN.com, <http://www.ign.com/articles12008/02125/audiosurf-au-review>.
Niese, Adam "Pixelsocks", "Interview with Dylan Fitterer of Audiosurf", PixelSocks, Sep. 4, 2008, pixelsocks.com, <http://www.pixelsocks.com/2008/09/04/interview-with-dylan-fitterer-of-audiosurf/>.
Hunt, Steve, "I'm Steve, creator of Beat Hazard & solo indie game developer, AMA", /t/IAMA Reddit Driven Q&A, Nov. 18, 2012, Topiama.com, <http://www.topiama.com/r/593/im-steve-creator-of-beat-hazard-solo-indie-game>.
Deliyannis et al., "Enabling Social Software-Based Musical Content for Computer Games and Virtual Worlds", Jan. 2011, Ionian University, Corfu, Greece.
Wroten, Alexander, Developing Musical Video Games Through Principles of Player-Music Interaction: A Thesis, Master of Arts in Digital Musics from Dartmouth College, Jun. 2011, pp. 1-33, Hanover, United States.
Wroten, Alexander, Developing Musical Video Games Through Principles of Player-Music Interaction: A Thesis, Master of Arts in Digital Musics from Dartmouth College, Jun. 2011, pp. 34-69, Hanover, United States.
Wroten, Alexander, Developing Musical Video Games Through Principles of Player-Music Interaction: A Thesis, Master of Arts in Digital Musics from Dartmouth College, Jun. 2011, pp. 70-101, Hanover, United States.
Wroten, Alexander, Developing Musical Video Games Through Principles of Player-Music Interaction: A Thesis, Master of Arts in Digital Musics from Dartmouth College, Jun. 2011, pp. 102-129, Hanover, United States.
European search report for application No. 12163491.9 dated Aug. 26, 2013.
Korean office action for application No. 10-2012-36070 dated Sep. 25, 2013.
Japanese office action for application No. 2012-87685 dated Oct. 8, 2013.
Japanese office action for application No. 2012-87685 dated Jul. 28, 2015.

* cited by examiner

IMPORTING AUDIO TO AFFECT GAMEPLAY EXPERIENCE

BACKGROUND

1. Technical Field

The present disclosure is directed to computer games, and in particular to importing external audio into computer-based games.

2. Description of the Related Art

Audio, whether in the form of a sound effect or a musical composition, plays an integral role in a wide array of computer games throughout the computer gaming world. Audio effects are often used in computer gaming to, for instance, give life to a graphical animation such as the casting of a spell, enhance the mood of a dramatic scene, or even to narrate a story through the use of voice acting. Additionally, many games also incorporate advanced sound techniques into the gameplay in order to create an immersive gaming experience for the user. For instance, many games incorporate the use of multichannel surround sound, which adds a directional component to sound effects within the virtual gameplay environment and which enhances the user's gameplay experience and immersion into the virtual world. As such, audio continues to play an ever-increasing role across all genres of computer games.

SUMMARY

Embodiments of the invention provide a method, computer-readable storage medium and system for incorporating external audio content into a computer game. The method, computer-readable storage medium and system include receiving, from a user, a selection of external audio content to import into a computer game, wherein the external audio content is separate from internal audio content of the computer game. Additionally, the method, computer-readable storage medium and system include analyzing the imported audio content to determine one or more acoustic characteristics of the audio content. The method, computer-readable storage medium and system also include affecting one or more game experience attributes of the computer game, based on the determined one or more acoustic characteristics of the audio content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention are directed to importing audio content into a computer game. Particular embodiments affect the gameplay of the computer game, based on the imported audio content. For instance, embodiments may use the imported audio content in conjunction with a sound gun in the computer game, enabling a user to effectively use the imported audio content as a weapon against enemies (e.g., monsters) in the computer game. Additionally, embodiments may analyze the imported audio content to determine acoustic characteristics of the imported audio content. Embodiments may then affect the gameplay of the computer game based on these determined acoustic characteristics. For instance, continuing the above example of using the imported audio content in conjunction with a sound gun, the behavior of the sound gun may be determined based on the acoustic characteristics of the imported audio content fired from the gun. Advantageously, by doing this, embodiments of the invention may provide a dynamic and interesting gaming environment through the importation and use of user-selected external audio content.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
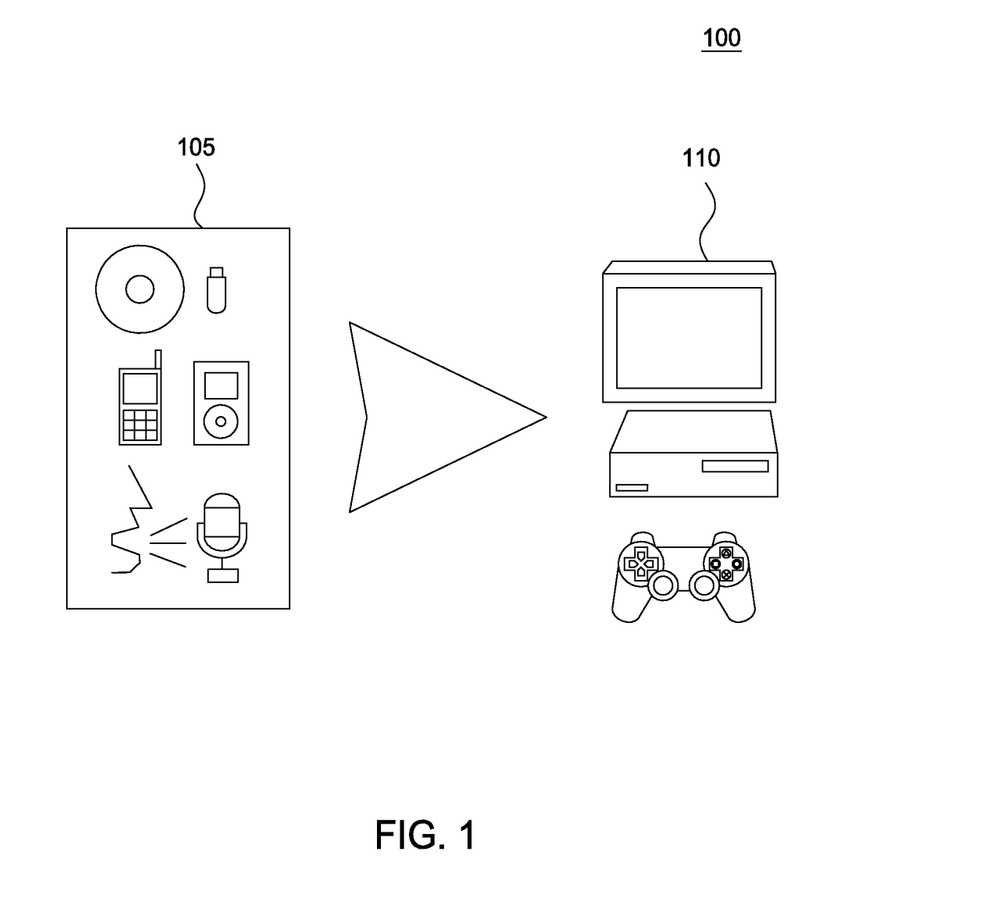
FIG. 1 is a diagram illustrating the import of audio into a computer game, according to one embodiment of the present invention.

Referring now to FIG. 1, a diagram illustrates the importation of audio into a computer game, according to one embodiment of the present invention. Generally, the diagram 100 shows the importation of audio from a variety of external sources 105 into a computer game 110. As shown, the external sources 105 include a variety of various computer-readable mediums and external audio sources. Exemplary computer-readable mediums are shown, including CD-ROMs, flash memory devices, cellular phones, music player devices (e.g., Apple iPod® and Microsoft Zune®). Additionally, the external audio sources may include the user's voice (e.g., through the use of a microphone), and may further include additional audio-producing devices such as musical instruments (e.g., a guitar or sound synthesizer). More generally, the external source 105 may be any medium or device external to the computer game that is capable of storing or creating audio effects and from which the audio effects may be imported into the computer game 110.

The computer game 110 may generally be any computer game running on any computer system that is capable of performing the functions described herein. For instance, the computer system 110 may a personal computer running a version of the Microsoft Windows® operating system. As a second example, the computer system 110 may be a dedicated gaming console, such as the Sony PS3® or Microsoft Xbox 360®. Additionally, it is contemplated that the computer system 110 may also be a mobile device. Exemplary mobile devices may include general-purpose mobile devices such as SmartPhones (e.g., the Apple iPhone®) as well as dedicated gaming mobile devices (e.g., the Sony PSP®). More generally, the computer system 110 may be any computer system capable of executing a computer game and performing the functions described herein.

As discussed above, the diagram 100 shows the importation of audio content from an external source 105 into a computer game 110. Once imported into the computer game 110, the imported audio content may then be used to affect one or more graphical elements within the computer game 110. For instance, in a computer game 110 where the user controls an avatar capable of casting spells, the imported audio content may be associated with a particular spell, such that when the user casts the spell, the computer game 110 may display a graphical effect displayed for the spell based on properties of the imported audio content. That is, when the user casts the spell using a first imported audio content, the graphical effect displayed may be different from when the user casts the same spell using a second imported audio content. Embodiments may determine how to affect the graphical element of the computer game 110, based on an analysis of the imported audio content. Such an analysis may include a measurement of frequency distribution, a measurement of tempo, a classification of the imported audio content, and so on. Advantageously, by doing this, embodiments of the invention may create a more dynamic gameplay experience for the user.

Additionally, embodiments of the invention may affect one or more gameplay elements of the computer game 110 based on a user selection of an imported audio content. For instance, using the above example of a computer game 110 where the user controls an avatar capable of casting spells, the properties of a particular spell may be determined based on the imported audio content selected by the user. For instance, the amount of damage dealt by an offensive spell may be determined based on a selection of imported audio content. Other examples include, without limitation, the damage type of the spell, the range of the spell, the area of the spell, the travel speed of the spell, and so on. Embodiments of the invention may determine which gameplay elements to affect and how to affect these gameplay elements, based on an analysis of the imported audio content. Furthermore, while the present examples pertain to a computer game featuring spell casting, such examples are without limitation and are for illustrative purposes only. Moreover, one of skill in the art will quickly recognize that embodiments of the invention may be utilized with a wide array of computer games of various genres.

Embodiments of the present invention may also affect one or more audio elements of the computer game 110, based on the imported audio content. For instance, according to one embodiment of the invention, a user may select imported audio content to use as a shield within a virtual world of the computer game 110. In such an embodiment, the computer game 110 may play the imported audio content while the shield is active. Additionally, as the shield takes damage within the virtual world, the computer game 110 may alter the playback of the imported audio content. For example, the bass and/or volume of the sound effect may be altered as the shield takes damage and decays. Advantageously, by doing this, embodiments of the invention may create a more immersive and dynamic computer gaming environment for the user.

Figure 2:
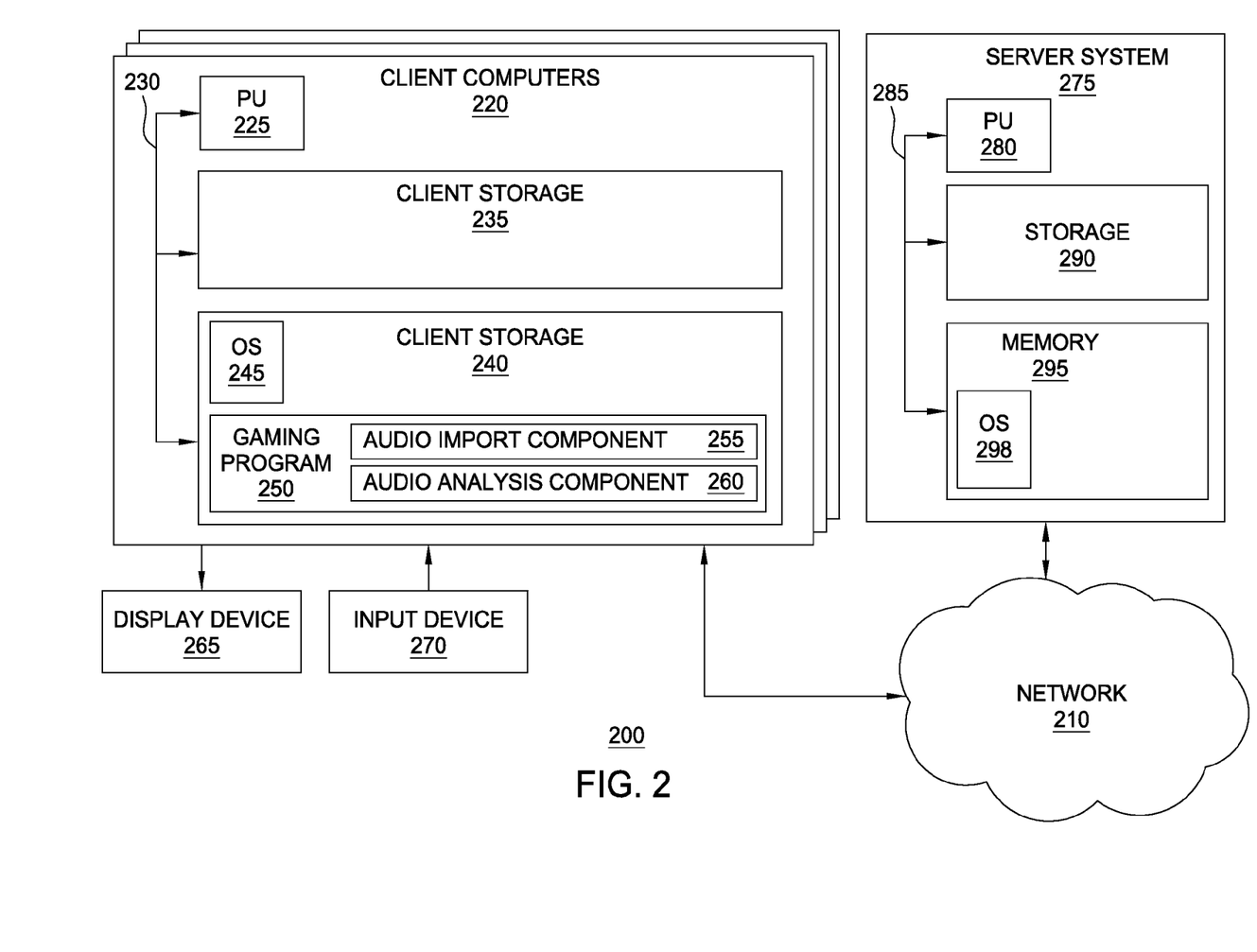
FIG. 2 is a block diagram illustrating a client-server view of a computing environment, according to one embodiment of the present invention.

FIG. 2 is a block diagram illustrating a client-server view of a computing environment, according to one embodiment of the present invention. As shown, computing environment 200 includes client computers 220, a network 210, and a server system 275. In one embodiment, the environment 200 may include existing computer systems, e.g., desktop computers, server computers, laptop computers, tablet computers, gaming consoles, hand-held gaming devices and the like. The computing environment 200 illustrated in FIG. 2, however, is merely an example of one computing environment in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Further, while FIG. 2 illustrates a client-server model, other models are contemplated such as a peer-to-peer model.

As shown, each client computer 220 includes a processing unit 225, which obtains instructions and data via a bus 230 from a client memory 240 and client storage 235. Processing unit 225 is a programmable logic device that performs instruction, logic, and mathematical processing, and may be representative of one or more CPUs and/or GPUs. Client storage 235 stores application programs and data for use by client computer 220. The memory 240 is any memory sufficiently large to hold the necessary programs and data structures. Memory 240 could be one or a combination of memory devices, including Random Access Memory, non-volatile or backup memory (e.g., programmable or Flash memories, read-only memories, etc.). In addition, memory 240 and storage 235 may be considered to include memory physically located elsewhere; for example, on another computer coupled to the client computer 220 via bus 230.

Client storage 235 includes hard-disk drives, flash memory devices, optical media and the like. Client computer 220 is operably connected to the network 210. Client memory 240 includes an operating system (OS) 245 and a gaming program 250. Operating system 245 is the software used for managing the operation of the client computer 220. Examples of OS 245 include UNIX, a version of the Microsoft Windows® operating system, and distributions of the Linux® operating system. (Note: Linux is a trademark of Linus Torvalds in the United States and other countries.) Additional examples of OS 245 include custom operating systems for gaming consoles, including the custom operating systems for systems such as the Microsoft Xbox 360® and Sony PS3®.

The gaming program 250 in turn contains an audio import component 255 and an audio analysis component 260. The audio import component 255 generally enables the user to select external audio content from an external audio source (e.g., external sources 105) and import the selected external audio content into the gaming program 250. Such importation may include converting the external audio content from a first encoding format to a second encoding format. The audio analysis component 260 generally analyzes imported audio content to determine one or more acoustic characteristics of the audio content. For example, such acoustic characteristics may include measurements such as frequency distribution (i.e., spectral content), tempo, volume, genre, and so on.

Additionally, the audio analysis component 260 may determine the frequency distribution of imported audio content by performing a Fast Fourier Transform ("FFT") or Time-Based Fast Fourier Transform ("TFFT") on the imported audio content. Additionally, other types of sound analysis could be performed on the imported audio content, according to embodiments of the present invention. Examples of such sound analysis include, without limitation, transient detection, root mean square ("RMS") detection, peak level detection, stereo phase difference, and discrete wavelet transform ("DWT"). More generally, it is contemplated that any sound analysis technique consistent with the functions described herein may be used in determining the acoustical characteristics of the imported audio content. The gaming program 250 may then alter one or more game experience attributes of the computer game, based on the determined acoustic characteristics of the imported audio content. As used herein, the game experience attributes of a computer game generally refers to graphical elements of the computer game (i.e., the appearance of elements within the game), gameplay elements of the computer game (i.e., the behavior of elements within the game) and audio elements of the computer game (i.e., sounds associated with elements within the game).

In one embodiment, each client is a dedicated gaming console, such as a Sony PS3® or Microsoft Xbox 360®, capable of executing the gaming program 250. In another embodiment, each client is a general purpose computer configured to run any variety of gaming and non-gaming software. The game may be viewed on a display device 265, such as an LCD, LED or CRT monitor display, and controlled using input devices 270 which may be, e.g., a keyboard, mouse and/or a controller.

As shown, the server system 275 includes the same basic hardware elements as the client computers 220. Specifically, the server system 275 includes a processing unit 280 (representative of one or more CPUs and/or GPUs), a memory 295 and storage 290 connected via a bus 285. The server system 275 may be operably connected to the network 210, which generally represents any kind of data communications network. Accordingly, the network 210 may represent both local and wide area networks, including the Internet. In one embodiment, the server system 275 hosts an on-line gaming environment to which one or more of the client computers 220 connect. In this case, server-side gaming software may be located on the server system 275 and cooperates with client-side gaming software (e.g., game program 250) located on the respective client computers 220.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a computer game configured to run an audio import component) or related data available in the cloud. For example, the computer game configured with the audio import component could execute on a computing system in the cloud and enable users to import external audio content into the computer game. In such a case, an audio analysis component of the computer game could analyze the imported audio content to determine acoustic characteristics of the imported audio content and stored the determined acoustic characteristics at a storage location in the cloud. The computer game may then alter the gameplay experience of the user playing the game, based on the determined acoustic characteristics for the imported audio content. Doing so allows a user to access the imported audio content information from any computing system attached to a network connected to the cloud (e.g., the Internet).

Figure 3:
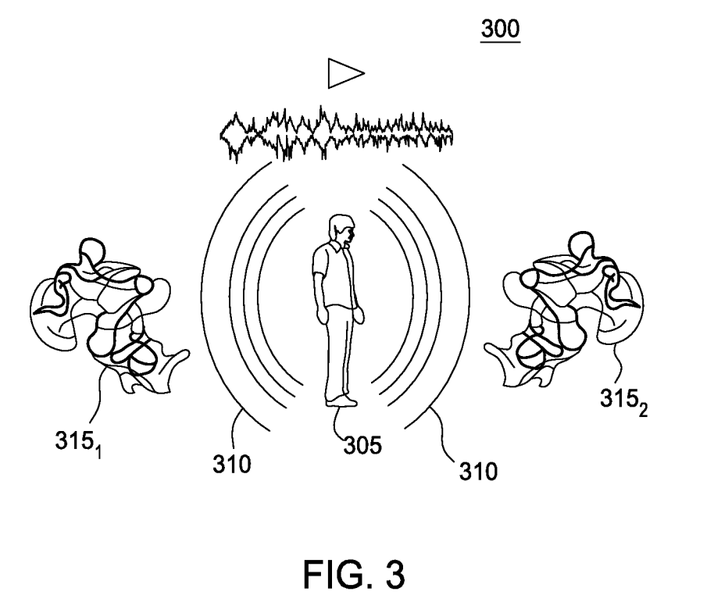
FIG. 3 is a screenshot showing imported audio used as a shield in a computer game, according to one embodiment of the present invention.

Additionally, in one embodiment of the invention, the user may select particular imported audio content to be used as a virtual shield within the virtual world of a computer game. For instance, FIG. 3 illustrates a screenshot showing imported audio used as a shield in a computer game, according to one embodiment of the present invention. As shown, the screenshot 300 includes an avatar 305 representing the user in the virtual world. Here, the avatar 305 is surrounded by a virtual shield 310, with the properties of the virtual shield 310 being controlled by properties of the imported audio content selected by the user. The screenshot 300 further shows two virtual monsters 315 within the virtual world.

As discussed above, an audio analysis component 260 of a computer game may perform an analysis of the imported audio content to determine one or more acoustic characteristics of user-selected imported audio content. The computer game may then affect one or more graphical elements, gameplay elements, and audio elements of the game, based on the determined acoustic characteristics of the imported audio content. For instance, in the context of the depicted example, the computer game may alter the appearance of the shield 310 surrounding the user's avatar 305, based on an acoustic characteristic such as a frequency distribution of the imported audio content. As an example, a color of the shield 310 may be dynamically altered, based on a frequency distribution of the imported audio content. Such a frequency distribution may be measured across the entirety of the imported audio content, a portion of the audio content, or at the current moment in playback of the audio content. As a second example, where the imported audio content is musical in nature (as opposed to an imported sound effect), the shield 310 may be configured to pulse to the beat of the imported audio content. Advantageously, embodiments of the invention tailor the gameplay experience of the computer game to the user's selection of audio content, and by doing this, may create a more dynamic and immersive gameplay experience for the user.

In one embodiment of the invention, when the user selects imported audio content to associate with the shield 310, the gaming program 250 may play the selected audio content for the user to listen to. By doing this, embodiments of the invention may encourage the user to listen to the user's preferred selection of music while playing the computer game. Additionally, the gaming program 250 may alter the audio content being played back, based on one or more gameplay elements. For instance, as the shield 310 decays (e.g., over time or based on incoming damage), the gaming program 250 may alter the playback of the imported audio content associated with the shield 310. For instance, the gaming program 250 may reduce the volume of the audio content as the shield 310 decays. By doing this, embodiments of the invention may notify the user of how much time or health is remaining on the shield 310.

In yet another embodiment of the invention, the gaming program 250 may affect one or more gameplay elements based on the user's selection of imported audio content. For instance, the depicted virtual monsters 315 may correspond to a first type of sound, and will damage the user's avatar 305 unless the avatar 305 uses a particular shield 310 of a second type of sound. As an example, a monster 315 may correspond to a particular musical genre (e.g., classical music), and the user may need to select imported audio content from an opposite musical genre (e.g., rock music) in order to create a shield that successfully defends against attacks from the monsters 315. In such an example, the gaming program 250 may indicate the musical type of the monster 315 using a particular graphic effect to represent the monsters. In one embodiment of the invention, the gaming program 250 may indicate the musical type by playing a particular sound effect when the user encounters the monster 315. Advantageously, by doing this, embodiments of the invention may create dynamic puzzles for the user to solve using imported audio content and may enhance the user's gameplay experience as a result.

In one embodiment of the invention, the gaming program 250 may perform one or more transformation operations on the imported audio content, such that when the imported audio content is used as part of the gameplay, only certain characteristics of the imported audio content remain. For instance, the audio analysis component 260 may process the imported audio content (e.g., using granular synthesis, reversing the playback of the imported audio content, and so on) to create transformed audio content. The user may then play the transformed audio content within the virtual world in order to affect the gameplay of the gaming program 250. By doing this, embodiments may create an enhanced and more interesting gaming experience, as particular imported audio content may have surprising characteristics once transformed. Embodiments may also improve the replayability of the gaming program 250 by encouraging users playing the game to experiment with importing different types of audio content.

Figure 4:
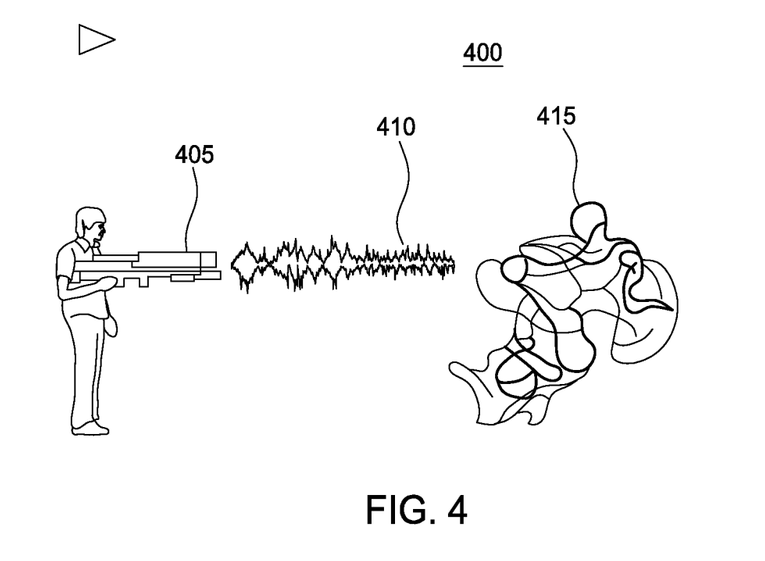
FIG. 4 is a screenshot showing imported audio used as a weapon in a computer game, according to one embodiment of the present invention.

Additionally, as discussed above, one embodiment of the invention includes a gaming program 250 configured to enable the user to select particular imported audio content to be used as a weapon within the virtual world of the game. For instance, FIG. 4 is a screenshot showing imported audio used as a weapon in a computer game, according to one embodiment of the present invention. As shown, the screenshot 400 illustrates an avatar 405 firing a sound weapon at a monster 415 in a virtual world. Here, the avatar 405 is shown with a weapon that fires a particular effect 410 based on a selection by the user of imported audio content. In other words, the user may associate particular imported audio content with the weapon, and when the user fires the weapon at the monster 415, the gaming program 250 will determine the effect 410 fired by the weapon based on the associated audio content.

Furthermore, the audio analysis component 260 may analyze the imported audio content to determine one or more acoustic characteristics of the content. The gaming program 250 may then determine the behavior of the sound weapon based on the determined one or more acoustic characteristics of the audio content associated with the sound weapon. As an example, the gaming program 250 may adjust the rate of fire of the sound weapon, based on a determined tempo of the imported audio content associated with the weapon. As a second example, the gaming program 250 may adjust the appearance of the graphic effect 410 fired by the weapon, based on a frequency distribution of the selected audio content. For instance, audio content with more high-pitched tones may be displayed with a first graphic effect, whereas audio content with more bass tones may be displayed with a different second graphic effect.

Additionally, the gaming program 250 may alter one or more gameplay elements based on the determined acoustic characteristics of the selected audio content. For instance, similar to the shield example discussed above, the sound weapon, when associated with imported audio content of a first genre, may be more potent against monsters 415 of an opposite musical genre. As an example, a sound weapon associate with imported audio content of the rock musical genre may be more potent against monsters 415 of a classical musical genre. Advantageously, by doing this, embodiments of the invention may create a more dynamic and immersive gameplay experience for the user by encouraging the user to solve puzzles by selecting imported audio content.

Figure 5A:
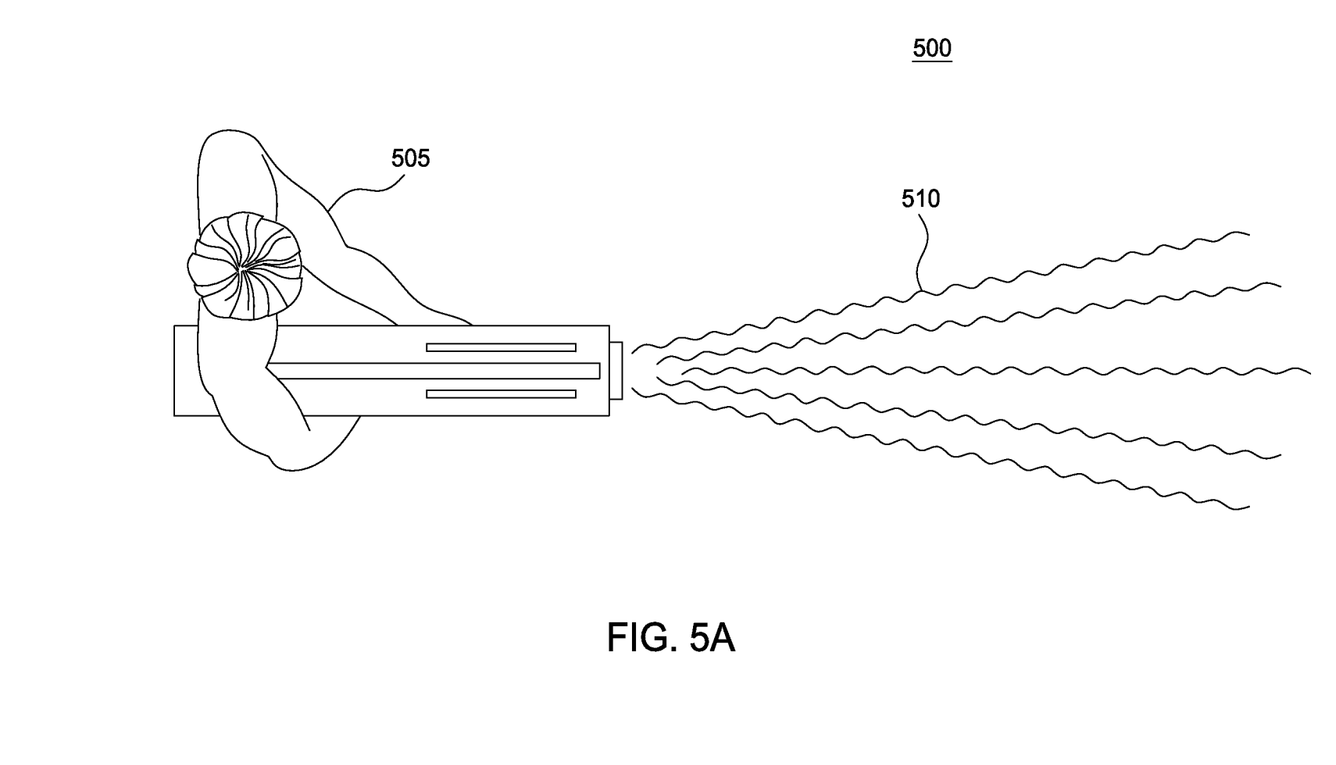
FIGS. 5A-5B are screenshots showing imported audio used as weapons in a computer game, according to embodiments of the present invention.
Figure 5B:
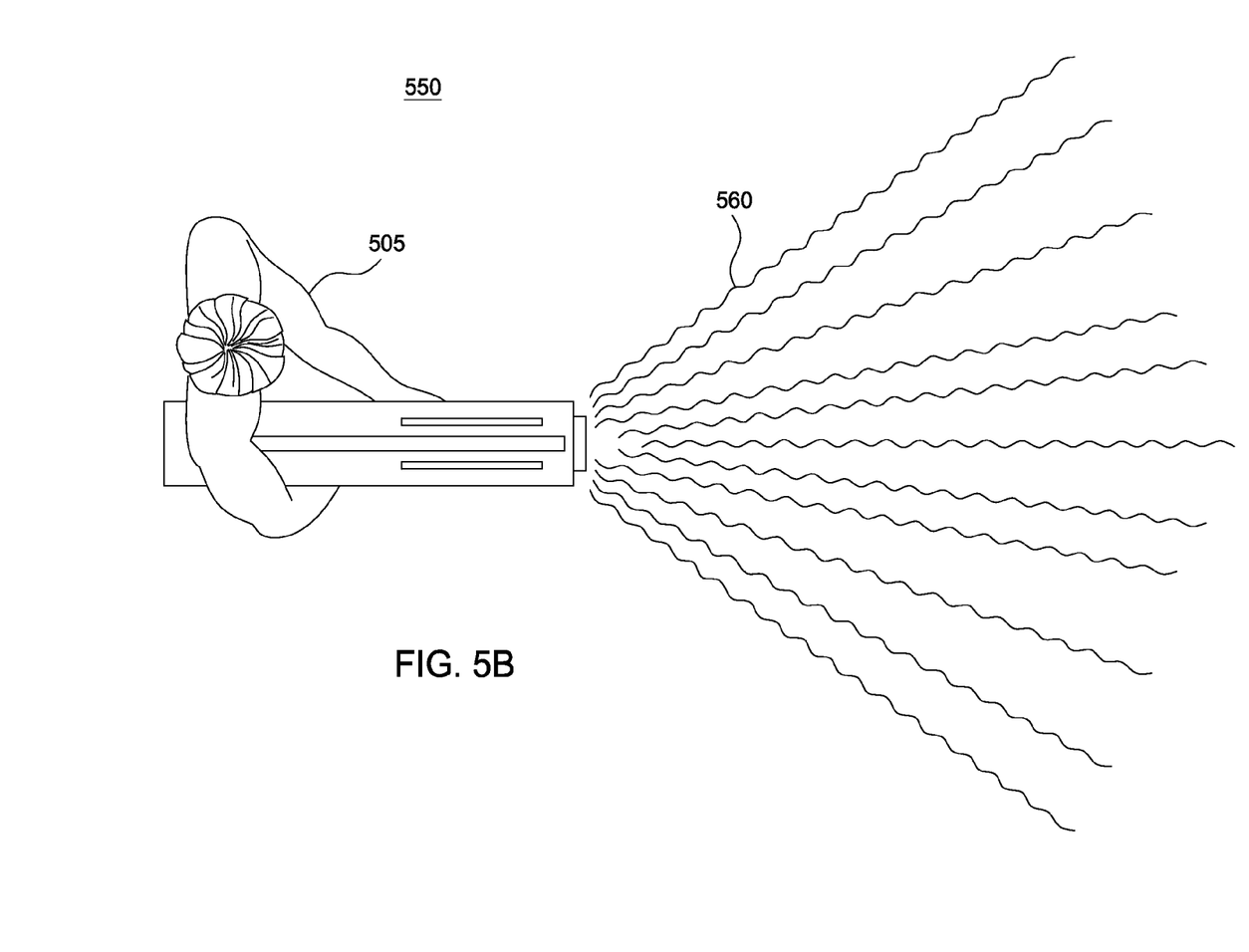

FIGS. 5A-5B are screenshots showing imported audio used as weapons in a computer game, according to embodiments of the present invention. As shown, FIG. 5A is a screenshot 500, illustrating an avatar 505 firing a sound weapon associated with a first imported audio content which produces a weapon effect 510. As discussed above, the gaming program 250 may be configured to adjust the graphical effect produced by firing a sound weapon, based on acoustic characteristics of user-selected audio content associated with the sound weapon. For purposes of the discussion of FIGS. 5A-5B, assume that the gaming program 250 is configured to fire a more-concentrated weapon effect 510 for imported audio content having more high-pitched tones, and to fire a wider, less-concentrated weapon effect 510 for imported audio content having more bass tones. Accordingly, the screenshot 500 illustrates a sound weapon associated with imported audio content having more high-pitched tones and thus firing a concentrated weapon effect 510. Similarly, FIG. 5B illustrates a screenshot 550 of the avatar 505 firing a sound weapon associated with a second imported audio content which produces a weapon effect 560. Thus, the screenshot 550 illustrates the sound weapon associated with imported audio content having more bass tones, and thus firing a less-concentrated weapon effect 560.

Advantageously, by adjusting the behavior of the sound weapon based on the user's selection of imported audio content, embodiments of the invention may create dynamic sound puzzles for the user to solve, and thus may create an improved gameplay experience. For instance, when the user's avatar is encountering multiple enemies in the virtual world, it may be optimal for the user to select imported audio content having more bass tones, so as to widen the weapon effect of the sound weapon (i.e., as is shown in FIG. 5B). Alternatively, when the user's avatar is encountering a single enemy in the virtual world, it may be optimal for the user to select audio content having more high-pitched tones, so as to fire a more concentrated effect from the sound weapon (i.e., as is shown in FIG. 5A). Thus, by altering the behavior of the sound weapon based on the audio content selected by the user, embodiments of the invention may create puzzles for the user to solve, while still allowing the user to listen to the user's preferred audio content.

Figure 6:
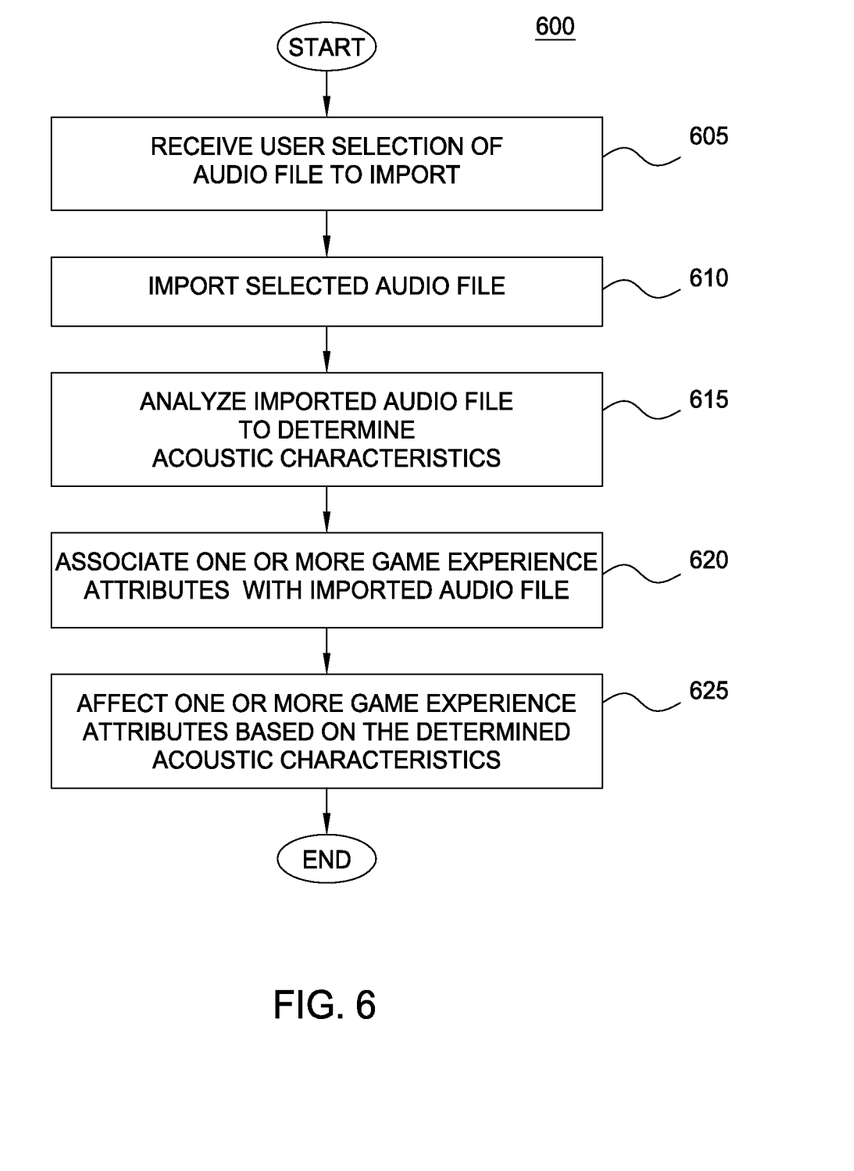
FIG. 6 is a flow diagram illustrating a method for affecting gameplay of a computer game based on imported audio, according to one embodiment of the present invention.

FIG. 6 is a flow diagram illustrating a method for affecting gameplay of a computer game based on imported audio, according to one embodiment of the present invention. As shown, the method 600 begins at step 605, where the audio import component 260 receives a selection from a user of an audio file to import. Upon receiving the selection from the user, the audio import component 260 imports the selected audio file into the gaming program 250 (step 610). It is broadly contemplated that the audio file may be imported from any medium capable of containing or producing audio content. As such, the audio content may be imported from a variety of different mediums, including CD-ROMs and flash memories, as well as external music player devices such as the Apple iPod® and the Microsoft Zune®. Furthermore, the external audio content may be in any format capable of representing audio content. Additionally, in one embodiment, the audio import component 260 may, as part of the importation process, convert the audio content from the external file format to an internal format the gaming program 250 is configured to interact with.

Upon importing the selected audio file, the audio analysis component 260 analyzes the imported audio file to determine acoustic characteristics of the imported audio (step 615). As discussed above, such analysis may include, for instance, a determination as to whether the imported audio content is a sound effect (e.g., a recording of a cannon firing) or is a musical composition (e.g., a song). Additionally, the analysis may determine a frequency distribution of the imported audio content. For example, such a frequency distribution may measured for a current point in the playback of the audio content, the entirety of the audio content, or a portion of the audio content (e.g., a window of time around the current point in the playback of the audio content). Furthermore, in the event the imported audio content is determined to be a musical composition, the analysis may determine acoustic characteristics such as the tempo of the musical composition. Of course, these examples are for illustrative purposes only and are without limitation. Moreover, one of ordinary skill in the art will quickly recognize that a wide array of other acoustic characteristics of the imported audio content may be measured consistent with embodiments of the invention.

Once the imported audio content is analyzed, the gaming program 250 associates the imported audio content with one or more elements of gameplay (step 620). For instance, the imported audio content may be associated with a sound weapon within the virtual world (e.g., as shown in FIGS. 4 and 5A-5B). Such an association may be responsive to a request from a user to associate a selected imported audio content with the gameplay element. For instance, in one embodiment of the invention, the gaming program 250 may provide a mechanism (e.g., a button or menu option) through which the user may associate audio content with a particular element of gameplay. Upon the user accessing the provided mechanism, the gaming program 250 may prompt the user to select particular audio content to associate with the element of gameplay.

The gaming program 250 then affects one or more game experience attributes, based on the determined acoustic characteristics of the imported audio content (step 626). Generally, the game experience attributes may include graphical elements of the computer game, gameplay elements of the computer game, and audio elements of the computer game. That is, such an alteration may include changing the visual appearance of the gameplay element (e.g., adjusting the rate of fire of a sound weapon based on the tempo of the audio content), changing the behavior of the gameplay element (e.g., adjusting the effectiveness of a particular sound shield based on a frequency distribution of the audio content), and/or changing a sound effect associated with the gameplay element (e.g., altering the playback of the audio content based on a decay of the sound shield). Of course, one of ordinary skill in the art will recognize that elements of the computer game may overlap, and at times multiple elements will be affected for a single purpose. For instance, continuing the example from FIGS. 5A-5B of the concentration of a blast from a sound weapon being based on the frequency distribution of imported audio content, the gaming program 250 may affect not only the visual appearance of a gameplay element within the computer game (e.g., showing the sound weapon firing a more concentrated blast), but may also affect the behavior of the gameplay element (e.g., enabling the sound weapon to strike a wider swath of virtual monsters).

As an additional example, the gaming program 250 may alter one or more structures of the virtual world that the avatar can interact with, based on the determined acoustic characteristics of the imported audio content. For example, if the audio content imported by the user is a selection of classical music, the gaming program 250 may alter structures in the virtual world to appear as $18^{th}$ century buildings. Alternatively, if the imported audio content is a selection of rock music, the gaming program 250 may alter the structures to appear as $20^{th}$ century urban buildings.

As yet another example, the gaming program 250 may alter one or more aspects of the user's avatar, based on the determined acoustic characteristics of the imported audio content. For instance, if the imported audio content is a selection of rock music, the gaming program 250 may alter the user's avatar to have exceptional strength. If, on the other hand, the imported audio content is a selection of classic music, the user's avatar may gain the power of flight, while a selection of blues music may grant the user's avatar the power of invisibility. Of course, these examples are for without limitation and are provided for illustrative purposes only. Moreover, one of ordinary skill in the art will quickly recognize that any number of other examples may be practiced consistent with the scope and spirit of the present disclosure.

In one embodiment, audio content imported into the computer game may be altered through the use of one or more transformation operations (e.g., using sound filters). For instance, as discussed above, the user may import a particular musical composition into the computer game (e.g., using the audio import component 255) and may associated the imported audio content with a sound weapon in the virtual world of the computer game. The user may then apply one or more weapon modifications to the sound weapon, which may both affect the performance of the sound weapon as well as apply various filters to the imported audio content associated with the sound weapon. For instance, using the above example of the rate of fire of the sound weapon being controlled by the tempo of the imported audio content, the user may apply a particular weapon modification to the sound weapon in order to slow down the sound weapon's rate of fire. In such an example, a filter may be applied to the associated audio content as well, in order to slow down the tempo of the audio content to correspond to the sound weapon's reduced rate of fire. Similarly, in an embodiment where the audio content is created from the user's voice (e.g., using a microphone) and subsequently imported into the computer game, a particular filter may be applied to the imported audio content in order to alter the user's voice (e.g., to create a unique comic voice for the user in the computer game) and to influence the associated gameplay elements of the computer game.

Once the elements of gameplay are altered, the method 600 ends. Advantageously, by doing this, embodiments of the invention help to create a highly customizable and dynamic gameplay for the gaming program 250. As an additional advantage, embodiments allow the user to listen to the user's preferred selection of music while playing the computer game, and may incentivize the user to listen to different types of music in order to affect the gameplay in various ways, thus creating a more interesting gameplay experience for the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for incorporating external audio content into a computer game, comprising:
   receiving a user-selection of the external audio content to import into the computer game, wherein the external audio content is separate from internal audio content of the computer game;
   responsive to the received user-selection of external audio content, analyzing, by operation of one or more computer processors, the external audio content to determine one or more acoustic characteristics of the external audio content, wherein one of the one or more acoustic characteristics comprises a musical genre for the external audio content;
   affecting one or more gameplay interactions between an avatar and a virtual character within the computer game, based on the determined musical genre of the external audio content, wherein the virtual character is assigned a first musical genre, and wherein the one or more gameplay interactions are affected in a manner that is determined based on a predefined relationship between the determined musical genre and the first musical genre;
   outputting for display the affected one or more gameplay interactions;
   creating modified audio content by modifying the external audio content in a predefined manner based on a current state of one or more virtual objects involved in the one or more gameplay interactions within the computer game; and
   audibly outputting the modified audio content.

2. The method of claim 1, wherein affecting the one or more gameplay interactions within the computer game comprises at least one of:
   affecting an appearance of one or more graphical elements of the computer game, based on the determined musical genre of the external audio content;
   affecting a behavior of one or more gameplay elements of the computer game, based on the determined musical genre of the external audio content; and
   affecting a sound of one or more audio elements of the computer game, based on the determined one or more acoustic characteristics of the external audio content.

3. The method of claim 1, wherein the one or more virtual objects include a virtual weapon, and wherein the one or more gameplay interactions within the computer game include a weapon effect of the virtual weapon, the one or more qameplay interactions further comprising:
   affecting a behavior of the virtual weapon, based on the determined one or more acoustic characteristics of the external audio content.

4. The method of claim 3, wherein the current state of a virtual object comprises a plurality of virtual modifications to the virtual weapon.

5. The method of claim 1, wherein the one or more virtual objects include a virtual shield, and the one or more gameplay interactions further comprising:
   affecting a behavior of the virtual shield, based on the determined musical genre of the external audio content.

6. The method of claim 5, wherein the current state of a virtual object comprises a level of decay of the virtual shield.

7. The method of claim 1, wherein the external audio content is imported into the computer game from at least one of an external music player device, a SmartPhone, a flash memory device, a CD-ROM, a DVD, or an audio recording device.

8. The method of claim 1, wherein the one or more acoustic characteristics of the external audio content include a measurement of frequency distribution.

9. The method of claim 8, wherein the measurement of frequency distribution is determined using at least one of Fast Fourier Transform and Time-Based Fast Fourier Transform.

10. The method of claim 1, wherein the one or more acoustic characteristics of the external audio content include a measurement of tempo.

11. The method of claim 1, further comprising:
    importing the external audio content into the computer game, wherein the external audio content is converted from an external audio encoding format to an internal audio encoding format.

12. The method of claim 1, wherein affecting the one or more gameplay interactions within the computer game further comprises:
    affecting a performance of a virtual shield within a virtual world of the computer game, based on the determined musical genre of the external audio content.

13. The method of claim 12, further comprising:
    altering a playback of the external audio content within the computer game, based on a decay of the virtual shield.

14. The method of claim 1, wherein affecting the one or more gameplay interactions within the computer game further comprises:
    granting one or more powers to the avatar within a virtual world of the computer game, based on the determined musical genre of the external audio content.

15. The method of claim 1, wherein affecting the one or more gameplay interactions within the computer game further comprises:
    affecting a performance of a virtual weapon within a virtual world of the computer game, based on the determined musical genre of the external audio content.

16. The method of claim 15, wherein the virtual weapon has improved performance against a virtual character associated with the first musical genre, and wherein the virtual weapon has impaired performance against a second virtual character associated with a second musical genre.

17. The method of claim 1, further comprising:
    affecting a visual appearance of the virtual character within a virtual world of the computer game, based on the determined musical genre.

18. A non-transitory computer-readable medium containing a program which, when executed, performs an operation for incorporating external audio content into a computer game, the operation comprising:
    receiving a user-selection of the external audio content to import into the computer game, wherein the external audio content is separate from internal audio content of the computer game;

responsive to the received user-selection of the external audio content, analyzing, by operation of one or more computer processors, the external audio content to determine one or more acoustic characteristics of the external audio content, wherein one of the one or more acoustic characteristics comprises a musical genre for the external audio content;

affecting one or more gameplay interactions between an avatar and a virtual character within the computer game, based on the determined musical genre of the external audio content, wherein the virtual character is assigned a first musical genre, and wherein the one or more gameplay interactions are affected in a manner that is determined based on a predefined relationship between the determined musical genre and the first musical genre;

outputting for display the affected one or more gameplay interactions;

creating modified audio content by modifying the external audio content in a predefined manner based on a current state of one or more virtual objects involved in the one or more gameplay interactions within the computer game; and audibly outputting the modified audio content.

19. The non-transitory computer-readable medium of claim 18, wherein affecting the one or more gameplay interactions within the computer game comprises at least one of:

affecting an appearance of one or more graphical elements of the computer game, based on the determined musical genre of the external audio content;

affecting behavior of one or more gameplay elements of the computer game, based on the determined musical genre of the external audio content; and affecting a sound of one or more audio elements of the computer game, based on the determined one or more acoustic characteristics of the external audio content.

20. The non-transitory computer-readable medium of claim 18, wherein the one or more gameplay interactions within the computer game include a weapon effect of a virtual weapon in a virtual world of the computer game, and the operation further comprising:

affecting a behavior of the virtual weapon, based on the determined one or more acoustic characteristics of the external audio content.

21. The non-transitory computer-readable medium of claim 18, wherein the one or more gameplay interactions within the computer game include a virtual shield in a virtual world of the computer game, and the operation further comprising:

affecting a behavior of the virtual shield, based on the determined one or more acoustic characteristics of the external audio content.

22. The non-transitory computer-readable medium of claim 18, wherein the external audio content is imported into the computer game from at least one of an external music player device, a SmartPhone, a flash memory device, a CD-ROM, a DVD or an audio recording device.

23. The non-transitory computer-readable medium of claim 18, wherein the one or more acoustic characteristics of the external audio content include a measurement of frequency distribution.

24. The non-transitory computer-readable medium of claim 23, wherein the measurement of frequency distribution is determined using at least one of Fast Fourier Transform and Time-Based Fast Fourier Transform.

25. The non-transitory computer-readable medium of claim 18, wherein the one or more acoustic characteristics of the external audio content include a measurement of tempo.

26. A system, comprising:

a processor; and a memory containing a program that, when executed by the processor, performs an operation for incorporating external audio content into a computer game, comprising:

receiving a user-selection of the external audio content to import into the computer game, wherein the external audio content is separate from internal audio content of the computer game;

responsive to the user-selection of the external audio content, analyzing the external audio content to determine one or more acoustic characteristics of the external audio content, wherein one of the one or more acoustic characteristics comprises a musical genre for the external audio content;

affecting one or more gameplay interactions between an avatar and a virtual character within the computer game, based on the determined musical genre of the external audio content, wherein the virtual character is assigned a first musical genre, and wherein the one or more gameplay interactions are affected in a manner that is determined based on a predefined relationship between the determined musical genre and the first musical genre;

outputting for display the affected one or more gameplay interactions;

creating modified audio content by modifying the external audio content in a predefined manner based on a current state of one or more virtual objects involved in the one or more gameplay interactions within the computer game; and audibly outputting the modified audio content.

\* \* \* \* \*